Feb. 6, 1951 A. KOLKS 2,540,824
ELECTRICAL CIRCUITS ADJUSTABLE BY
RECTILINEARLY VARIABLE ELEMENTS
Filed Sept. 10, 1947 3 Sheets-Sheet 1

INVENTOR.
ARNOLD KOLKS
BY
Paul Kolisch
ATTORNEY

Feb. 6, 1951 A. KOLKS 2,540,824
ELECTRICAL CIRCUITS ADJUSTABLE BY
RECTILINEARLY VARIABLE ELEMENTS
Filed Sept. 10, 1947 3 Sheets-Sheet 2

Inventor
ARNOLD KOLKS

By
Paul Kolisch
Attorney

Patented Feb. 6, 1951

2,540,824

UNITED STATES PATENT OFFICE 2,540,824

ELECTRICAL CIRCUITS ADJUSTABLE BY RECTILINEARLY VARIABLE ELEMENTS

Arnold Kolks, New York, N. Y.

Application September 10, 1947, Serial No. 773,099

2 Claims. (Cl. 171—777)

This invention relates to improvements in adjustable electrical circuits. More particularly it relates to improved electrical circuits including variable resistors, and/or capacitors and/or inductors each of which has two elements rectilinearly movable with respect to each other and a mechanism for imparting the rectilinear movement.

It is common practice to include in a great variety of electrical circuits elements whose values can be controllably varied for such purposes as rendering the circuits, or portions thereof, selective to particular frequencies, varying gain or attenuation, controlling frequency response, etc. For example, in the circuit of a tuned radio frequency receiver it is common practice to provide means for simultaneously varying the capacitive reactance of a plurality of resonant circuits. The most common practice has been to employ a plurality of ganged variable condensers, one for each tuned circuit, each condenser consisting of a plurality of semi-circular flat plates joined together at their edges to form a stator and a plurality of similar but smaller plates joined together at their centers on a shaft to form a rotor with each of its plates fitted between two of the stator plates and insulated therefrom by an air space. By rotation of a shaft all of the rotor plates can be moved simultaneously so that more or less of the area of each is subtended by its adjacent stator plates. Though this type of condenser is suitable and has been widely used, it is not satisfactory in certain applications. Each of the rotor plates is usually held at one point only and is free to vibrate with respect thereto. Vibration of the rotor plates affects their spacings from stator plates and, therefore, renders unstable the reactance of the condenser. Where a loud speaker is included within a receiver near to this kind of a condenser, the movements of the speaker cone may cause vibrations of the rotor plates and produce distortion known as microphonics. This is especially undesirable in FM receivers since tuning condenser microphonics will interfere with performance of the discriminator so as to distort the demodulated signal components. Obviously, it is highly desirable that no movement, between relatively fixed and relatively movable portions of a variable circuit element, in any but controlled directions, i. e. angular rotations of the rotor either clockwise or counterclockwise, should have any effect upon the electrical value of that element. This is one reason why permeability tuned inductances are used in FM receivers. If the depth to which a powdered iron core is inserted into an inductance coil is varied, i. e. if the core is moved along the coil axis to intercept more or less of its flux paths, the self-inductance of the coil will change in known manner. However, if the powdered iron coil moves crosswise to the coil axis the variations in self-inductance will be negligible.

One of the reasons why superheterodyne receivers came to be preferred to tuned radio frequency receivers was that their use of several stages of amplification at a fixed frequency (I. F.) reduced the required number of ganged tuning condensers. The multi-section tuning condensers in tuned R. F. receivers were bulky and expensive, they required elaborate and equally bulky shielding, and their microphonics added to the natural instability of these receivers. If ganged permeability tuned coils are used, these difficulties are not encountered. Another advantage of such a coil is that its movable part, i. e. the core, is not electrically connected to the circuit whereas the rotor is, usually to ground either over a flexible pigtail or a spring contact.

For particular purposes there are also advantages in designing a resistor or a capacitor so that its value can be varied by moving a relatively movable element in a rectilinear direction with respect to a relatively fixed element. For example, in a tunable circuit employing permeable tuning in combination with condenser tuning (so as to extend the frequency range of variation for a given amount of mechanical movement) it is advantageous to employ a capacitor whose tuning mechanism can be conveniently ganged with that of the permeable tuned coil, i. e. whose mechanism is also adapted to cause relative rectilinear movement between elements of the condenser. In the case of a resistor it is convenient to place resistive material on an insulated support along a rectilinear pathway to produce an element having linear variations in resistance over progressively larger or smaller portions of its length. As a matter of fact it is well known that many of the precision variable resistors used in laboratories consist of a resistive coating or wire placed along a straight elongated ceramic insulator with a movable slide engaging said material or along its axis.

The use of circuit elements adjustable by relative rectilinear movement of cooperating elements has been retarded due to the lack of inexpensive mechanical means for controlling that movement. Such a mechanical means must necessarily include guideway elements capable of precision performance and such elements do not ordinarily lend themselves to inexpensive manufacture.

In the manufacture of guideways it has been the practice to employ accurately machined cooperating bearing surfaces for adjacent members between which guided relative movement is to be permitted. The manufacture of these surfaces is expensive because it involves such processes as boring, grinding, reaming, polishing, etc. This is particularly undesirable for small manufacturing plants which ordinarily are not equipped for automatic mass production of finished parts. In addition to the cost of close fitting accurately machined parts, there are added disadvantages. These close fitting parts are relatively difficult to assemble and to adjust; they are accurate only when new and become inefficient when the machined surfaces wear out; and they entail considerable amounts of friction and wear between sliding and slipping surfaces, thus accelerating deterioration with use. In addition like other mechanism entailing the friction of sliding surfaces, significant amounts of power are wasted in friction. In the case of precision devices one particular disadvantage is that due to adhesion between rubbing surfaces accurate settings and resettings are difficult. Because of these drawbacks, and in particular because it has been prohibitively expensive to manufacture reliable guideways meeting high performance requirements at low cost, it has been customary in many of the arts to substitute rotating parts wherever possible for elements which otherwise should preferably move rectilinearly.

Moreover, tuning condensers of the kind described above have been used for many years during which they have undergone such development and refinement that efficient manufacturing processes have been evolved. Therefore, it is commercially essential that any mechanism for controlling relative rectilinear movements of two parts of a circuit element must also lend itself to inexpensive manufacturing processes and to construction of materials which are readily available and inexpensive.

It has been a common practice where a plurality of circuit reactance adjustments had to be made in a synchronous manner to employ ganged tuning condensers. Where additional synchronous adjustments had to be made it has been necessary to provide mechanical means for synchronizing the movement of the ganged condenser rotors with a number of other relatively movable parts of circuit elements, i. e. to use gears, and/or levers, and/or string-and-pulley arrangements, etc. Where it was desired to adjust a number of permeability tuned inductance simultaneously it has been the customary practice to employ a separate mechanism, such as a string, to move each iron core with respect to its cooperating coil and to employ a means for synchronizing the driving action of the individual driving means, for example to employ a single driving shaft around which several such strings are wound so that movement of the shaft will simultaneously let them all out or wind them all in. String drives of this sort have been difficult to adjust, they have been unreliable in holding their adjustments, and synchronism through an indirect agency of this sort, or indirect agencies of other known sorts, has been inaccurate.

It is an object of the present invention to improve adjustable electrical circuits by using inductors and/or capacitors and/or resistors whose values are variable by the relative rectilinear movement of one element with respect to another under control of a novel guideway.

It is a further object of the present invention to improve adjustable circuits as stated above and to employ in conjunction with the novel guideway a means for translating rotary movement into rectilinear movement of said elements with respect to each other in directions parallel to a guided axis of the guideway.

It is a further object of the present invention to improve adjustable electrical circuits in the manner indicated above through the use of means, including the novel guideway, for permitting control of the spacing between two parallel surfaces to draw them apart or move them together with a minimum of movement of any part of either of the surfaces in any but a controlled rectilinear direction parallel to a guided axis of the guideway and means for connecting to each of the surfaces a plurality of elements positioned to engage a second plurality of cooperating elements connected to the other surface so that ganged and synchronous rectilinear variations of the engagements of all of the pairs of cooperating elements are directly attained when the surfaces are moved with respect to each other.

It is a further object of this invention to devise an improved inductance whose value of self-inductance may be varied by relative rectilinear movement between a coil and a cooperating element such as a powdered iron core, a conductive slug, or a shorted winding which is inductively coupled to the coil, the rectilinear movement being under control of a novel guideway.

It is a further object of this invention to devise an improved circuit including a plurality of tuned radio frequency circuits variable in synchronism by varying the self inductances of an equal plurality of permeability tuned inductances by relative rectilinear movement as stated above, with or without simultaneously varying the capacitances of a plurality of condensers also by relative rectilinear movement of cooperating elements, the relative rectilinear movement between all pairs of cooperating elements being under control of a novel guideway.

It is a further object of this invention to devise an improved frequency modulation tuner employing circuit elements adjustable by relative rectilinear movement between cooperating parts under control of a novel guideway.

It is a further object of this invention to devise an improved multi-band tuner for selecting energy in particular radio frequency bands and converting it into energy in an intermediate frequency band including a plurality of sets of tuning elements adjustable by relative rectilinear movement between cooperating parts under control of a novel guideway, a number of vacuum tubes, circuits for the tubes, and band switch for connecting different sets of said elements into said circuits.

It is another object of this invention to devise a multi-band radio frequency tuner in which elements, such as inductances and/or condensers and/or resistors, adjustable by relative rectilinear movement of cooperating elements thereof under control of a novel guideway, the mechanism of the guideway, a number of vacuum tubes, circuits for the tubes, and band switching means for connecting different sets of said elements into the tube circuits, are all parts of a single compact unit wherein wiring lengths, stray capacitances, etc. can be predetermined to permit convenient use of the tuner as a whole with other receiver components, such as I. F. amplifiers, etc. rather than of unassembled elements thereof whose adaptation to a receiver might present a problem of design engineering.

Other objects, features and advantages of this invention will be apparent to those skilled in the art from the following description of this invention and from the drawing, in which:

Fig. 3 is a schematic representation of the electrical arrangement of elements of multi-band tuners, such as are shown in Figs. 1 and 2;

Fig. 3a is a schematic representation of an alternate arrangement of the cathode circuit of the radio frequency amplifier tube shown in Fig. 3 by which there is provided a means for varying the gain of this tube in synchronism with variations in the resonant frequency of its input and output circuits;

Fig. 3b is a schematic representation of an alternate arrangement of the anode energizing circuit of the oscillator tube of Fig. 3 by which there is provided a means for varying the strength of the local oscillations in synchronism with changes in their frequency.

Figure 1:
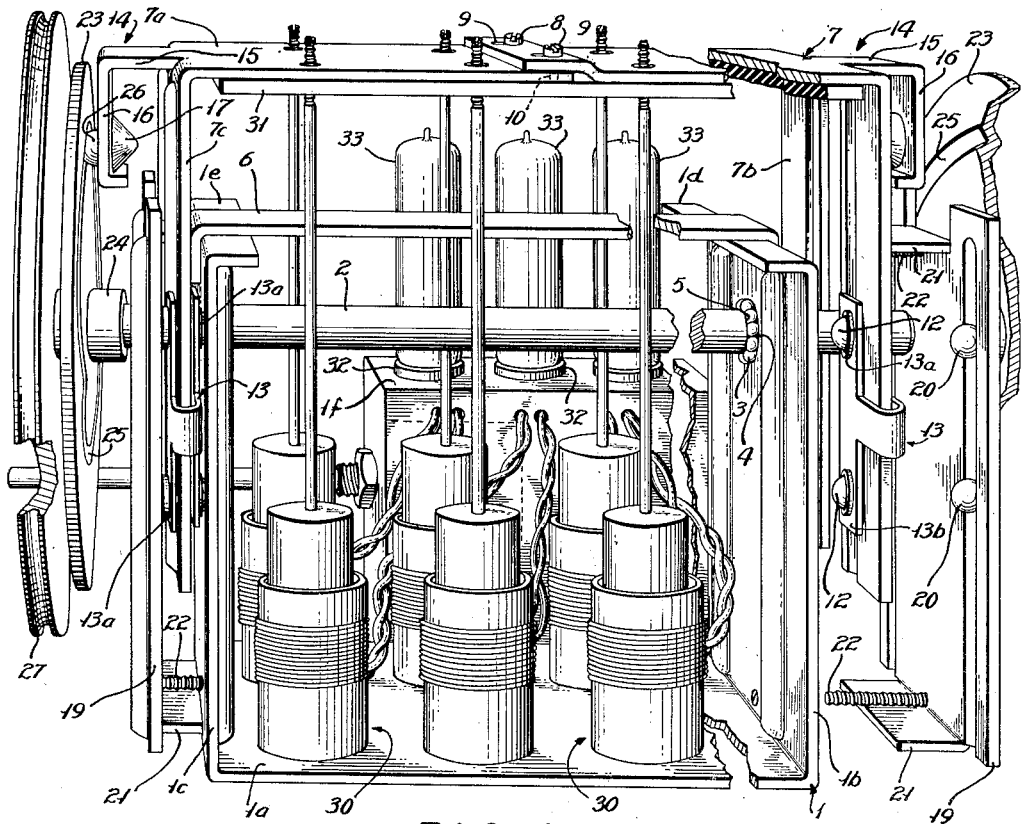
Fig. 1 is a side view of an embodiment of this invention consisting of a multi-band tuner. A portion is represented as broken to indicate that it may be of any convenient size for mounting all the tuning elements required for a desired number of operating bands.

Frame I of Fig. 1 consists of a sheet metal stamping having a base plate portion Ia, two upright sides, Ib and Ic, which are bent up at right angles from the base portion from opposite edges thereof, and a tube chassis, If. Frame I may be conveniently and economically formed in a power press and either by the initial pressing operation therein or by subsequent similar ones its upright sides may be formed to provide rectilinear ball raceways, shaft ball bearing annular raceways, and top-edge reinforcing lips all of which are fully described below. Similarly the base portion may be punched to provide holes suitably placed for holding coil forms to be described below and for mounting the frame on a radio chassis.

Tube chassis If may be formed of a part of the original sheet from which the base portion is punched out. It comprises an upright portion, which is bent up at right angles to the base portion and extends upward for a distance somewhat greater than the width of a band switch to be described below (and also greater than the depth of the lower half of a miniature tube socket), a ledge portion bent out at right angles to the upright portion to afford a shelf upon which tubes may be mounted, and a front portion which may be conveniently formed either by bending back for 90° sheet material along the upright front edge of the upright portion or by bending down for 90° material along the front edge of the ledge portion. Three holes are punched through the ledge portion. They are of the proper size for mounting miniature tube sockets in a known manner. A hole is punched through the front portion. It is of the proper size for receiving the panel-mounting bushing of a switch to be described below. Some of the material of the upright portion may be punched out, for example as shown in Fig. 1, to provide space through which may pass wires extending between terminals on the bottoms of tube sockets mounted in the ledge portion and elements supported on base portion Ia in a manner disclosed below.

As can be seen from Fig. 1 a shaft 2 is supported between upright sides Ib and Ic by two sets of balls 3 seated in opposed annular raceways 4 each of which may be formed by pressing out some of the material of one of the upright sides (and punching a hole through the center thereof) to form a cuplike inner working surface of the same shape as the outside curved surface of a short truncated cone. Shaft 2 has a groove 5 of approximately semi-circular cross section turned into its outer surface at each of the points thereof where the shaft will be supported on one of the sets of balls. In assembling shaft 2, sets of balls 3, and frame I the shaft is slid through the punched out holes in the upright sides until each of its grooves is near the upright side in which it is to be supported; with the shaft held in a vertical position one set of balls is dropped between the outer surface of the shaft and the inner surface of the annular raceway whose cuplike surface is facing upward, the shaft is slid upward or downward if necessary until this set of balls falls into place in the shaft groove intended for them; while a slight force is exerted along the shaft axis to keep this set of balls captive against the cuplike surface the frame is inverted so that the other cuplike raceway faces upward; the upright sides are sprung slightly apart and while they are in this condition the other set of balls are dropped into place between the upturned free raceway and the free shaft groove in the manner described above; the upright sides are allowed to spring back to hold both sets of balls captive; tension element 6 (see Fig. 1) is slipped over the top edges of the upright sides to exert a predetermined amount of pressure to keep the shaft in true alignment but not under sufficient pressure to bind it. The tension element in addition to maintaining shaft alignment will prevent frame I from becoming accidentally spread to such an extent that the balls can fall out and become lost. If desired the tension element may be formed so that adjustment of tension is possible. For example, this element may consist of rod with screw threads and an adjustment nut provided at one end so that the nut could be turned along the rod as desired to provide controlled tension between the upright sides. However, where the thickness of the sheet metal used is kept within predetermined limits and where the balls are of uniform size the tension element may, as shown in the drawing, consist of a flat strip of metal with its ends bent over at right angles to form retaining surfaces spaced from each other by a predetermined fixed distance.

As will be fully described below tension element 6 may be held in its position across the top edges of frame I by screws which play a part in holding together other elements of this device.

Each of the upright sides Ic and Ib has two rectilinear raceways pressed into its outer surface. The axes of the raceways on an upright side are parallel to each other and perpendicular to base plate portion Ia and in each upright side one of the rectilinear raceways is located on each side of the hole therein through which shaft 2 passes. Preferably the raceways may have V-shaped cross sections with 90° spread between the arms forming the V.

For certain applications it may be advantageous to polish the flat converging surfaces of the raceways or to harden them by tempering, heat treatment, or chromium plating. However, for many applications a high standard of performance will be achieved without any processing after the pressing operation. Appreciable smoothing and hardening of certain sheet metals in the area of a press can be achieved inexpensively in the pressing operation itself by using dies and pressure appropriate to cause an appreciable flowing and compressing of the metal in the press. As is seen in Fig. 1 a small portion of the material at the top of each of the upright sides is bent over at right angles to form top-edge reinforcing lips 1d, 1e for the upright sides. It will be apparent after a full description of this invention that for applications where unusually accurate performance is required the stiffening effect of the reinforcing lips will serve an obvious good purpose.

An elevator element 7 consists of two halves, a front half and a rear half. The two halves are joined by a pair of screws 8 which pass through elongated holes 9 in the rear half and engage threads 10 in the front half. This arrangement not only simplifies assembling of the device but as will be described below it permits independent adjustment of the front and rear guideways. When the halves are joined together elevator element 7 comprises a top platform portion 7a (consisting of two halves which are fastened together by screws 8) and two guided sides 7b and 7c which are bent downward at right angles from the platform portion from opposite edges thereof. The platform portion as measured between the outside edges of the top ends of the guided sides is wider than the corresponding dimension of base portion 1a by an amount approximately equal to twice the thickness of the sheet material used in forming elevator element 7 plus twice the thickness of the sheet material used in forming frame 1 plus twice the amount of space maintained between each of the guided sides and the upright side cooperating with it by polished balls which are placed between them in a manner to be disclosed below.

When the elevator element is so proportioned with respect to the frame it will fit over the frame; its guided sides will fit around the upright sides of the frame; and the polished balls, whose installation will be described below, will fit between them in opposed raceways under appropriate pressure so that the elevator element will be movably mounted on the frame on rolling supports. There is punched out of each of the guided sides a centrally located opening extending along enough of its length so that, even when shaft 2 is assembled in frame 1 with each of its ends extending beyond the outside surface of one of the upright sides, the elevator element can be assembled over the frame with the shaft ends protruding through these openings and will be free to move up and down without being impeded by the shaft ends even though they extend through the guided sides. This punched out opening is wider than the shaft diameter but is narrower than the distance between the rectilinear raceways on the upright sides. This leaves solid material on each of the guided sides into which there are pressed parallel raceways spaced from each other by the same distance as that between the rectilinear raceways on each of the upright sides of frame 1. These raceways which also are rectilinear are pressed into the inner surface of the guided sides, i. e. the surfaces of the elevator element which face each other. In addition to being parallel to each other and these raceways are perpendicular to top platform portion 11 and, for each guided side, one of the raceways is formed in the material remaining on each side of the central opening after it is punched out. Thees raceways have the same cross sectional shape as described above for those in the upright sides.

In adding the elevator element 7 to the subassembly comprising frame 1, shaft 2, sets of balls 3, and tension element 6, the screws 8 are first removed to take apart the elevator element and then each of the elevator halves is added to the subassembly with a shaft end passing through the punched out opening in its guided side and with the raceways in that side registered and in alignment with the raceways of the upright side supporting that shaft end; two polished steel balls 12 are inserted between each pair of raceways thus aligned within loosely fitting retainer holes 13a in one of the tabs 13b of a spacer cage 13 (one of which had previously been slipped over each of the edges of each guided side with one of its tabs against its inside surface and the other against its outside surface); the guided sides are pressed firmly toward each other and against the upright sides to hold the steel balls captive between the aligned raceways; and screws 8 are set in place and tightened to maintain this pressure until a later final adjustment of the whole device.

Each of the halves of the elevator element includes a lug 14 by which elevator element 7 may be driven upward or downward in the guided direction. As can be seen from Fig. 1 each of the lugs may be formed of a portion of the material punched out from each of the guided sides in forming the punched out opening therein. This portion of the material is shaped by the same or a subsequent pressing operation so that it comprises an extension 15 which may be in the same plane as top platform portion and which extends outward beyond the plane of the guided side and a lug portion 16 bent down at right angles from the end of extension 15 to provide a surface parallel to that of the guided side in which there is formed a ball socket or recess 17.

There are two pressure plates 19. Each of them consists of a sheet metal stamping of about the same size and shape as an upright side and has a hole punched through it in a position corresponding to the location of the annular raceway in an upright side. This hole in each plate 19 is large enough to permit the plate to be assembled against a guided side with a shaft end protruding through the hole without binding in it. Two rectilinear raceways are stamped in the pressure plate parallel to each other and parallel to the upright edges of the pressure plate. A number of polished steel balls 20 similar to the balls 12 mentioned above are used to produce rolling relative motion between each pressure plate and the guided side with which it cooperates. Unlike the balls 12, however, the balls 20 are not captive between two opposed V-raceways. Each ball 20 while it is captive on one side in a V-raceway in that surface of a pressure plate into which its V-raceways were pressed is held in place on its other side by impinging upon the surface of a guided side opposite to that into which its V-raceways were pressed. The metal pressed back to form a V-groove on the front surface of a guided side forms an inverted V protrusion on its back surface and this protrusion has a shoulder upon which polished steel balls 20 may conveniently bear and along which they will be free to roll.

Though each individual ball 20 thus rides against but a single bearing surface on the back of a guided side, i. e. against one shoulder of an inverted V protrusion instead of between two walls as in a V-shaped groove, nevertheless opposed different ones of the balls 20 bear on shoulders which face away from each other and therefore good guiding action results.

As can be seen from Fig. 1c of my copending application filed on the same day as this and entitled "Ball Bearing Rectilinear Guideway and Translation Devise" it is possible to employ an alternate arrangement for the raceways by which the balls 20, as well as the balls 12, are captive between V-raceways impinging on them from two opposite sides. This arrangement has an additional advantage that a set of dies suitable for stamping raceways into the upright sides and the guided side may also be used for stamping raceways into the pressure plate. Moreover, this arrangement permits the use of a large number of the balls 12 and thus provides an increased total bearing area. Raceways, in this alternate arrangement are formed in pairs of V-grooves, each groove of each pair being parallel to and adjacent to the other one so that together they have a W-shaped cross section on the pressed-in side and an inverted W-shaped cross section on the opposite side. Obviously, a W-cross section includes two V-cross sections and an inverted W-cross section includes a V-cross section. Therefore, by reversing each pressure plate in assembling the device so that its rear surface faces the rear surface of a guided side, registered V-grooved raceways will be afforded between which sets of balls 20 may be inserted and held captive.

Where maximum manufacturing economy is desired the pressure plate may be made flat, i. e. without any pressed-in raceways. Each of the balls 20 will be captive in a retainer 13a of a spacer cage 13 (which in turn will itself be captive to a guideway assembly by a pair of balls 12). Because each of the balls 20 is thus captive it will roll along a straight line pathway on the front surface of a pressure plate, even though it is not running in a groove, because it will be guided in that direction by the spacer cage holding it. Moreover, by properly adjusting the position of each tab 13b which is retaining balls 20, each ball 30 can be made to impinge on a flat portion of the rear surface of the upright side rather than against a shoulder of a pressed-out protrusion thereon so that the ball will roll between parallel flat surfaces, one afforded by the back of the guided side and the other afforded by the surface of a pressure plate which faces it.

At the top and bottom of each of the pressure plates there is a turned over spacer 21 of such width that the pressure plate can be rigidly screwed to an upright side without crushing any of the steel balls 12 or 20; without forcing any of the balls into the material comprising an upright side, a guided side, or a pressure plate; and without bending any of these component parts. Screws 22 pass through holes at the top and bottom of each of the pressure plates near the spacers and engage threads in the upright sides so that pressure plates can be drawn into firm union with the upright sides, i. e. can be drawn against the upright sides until stopped by impingment of the spacers. The screw 22 at top of each pressure plate passes through a hole in a bent over end of tension element 6 before engaging the threads provided in an upright side. Tension element 6 is thus held in its proper place on the top edges of the upright sides.

There are two cams 23 each of which consists of substantially circular sheet metal stamping connected to a collar 24, or other suitable element for clamping the cam in place on shaft 2, and has a cam raceway 25 stamped into its inner surface. Each cam raceway, which like the rectilinear raceways, may have a V-shaped cross section, follows on the inner surface of its cam a path successive points of which are progressively near to the imaginary center point of the cam collar, or farther away from it depending upon the portion of the raceway on which such points are located as well as the direction in which they are successively considered along that portion. A preferred shape for the path of a cam raceway is that of the conventional art device used to represent a heart. Assuming a fixed reference line which is initially registered with a heart-shaped cam so as to divide it into two symmetrical halves, rotation of such a cam for a first 180° from such a reference line will either progressively move the point of intersection of this line with the cam path away from or toward the center of the cam collar and rotation of the cam for the remainder of one complete revolution, i. e. for a second 180°, will progressively move said point of intersection conversely, i. e., toward or away from the center of the cam collar. Thus, it is seen that if this kind of a cam is employed to drive an element in a rectilinear guided direction, that element will reciprocate as the cam is continuously rotated. Moreover, as can be mathematically demonstrated, if a cam which has an appropriately curved heart-shaped path is rotated at an uniform angular rate about a center of rotation appropriately located on a line dividing the heart into two symmetrical halves, a straight line measurement from the center of rotation to the cam raceway along a fixed angular reference line will become progressively longer or shorter as the cam is rotated and will do so at a constant rate of change. In other words when its heart-shaped cam raceways are appropriately shaped with reference to an appropriate center of rotation a device according to this invention will translate rotary motion into rectilinear motion in a linear manner.

Where maximum manufacturing economy is desired the cam pathway may be a circle with its center offset with respect to the center of the cam collar. A die for pressing such a cam pathway can be inexpensively turned out on an ordinary lathe and this will permit considerable economy. The linear translation described above will not be achieved however. Rather than this the rate of change will vary in a manner which can be predetermined. For certain purposes this will be beneficial and for others it will not.

As will be described below relative rectilinear movement between cooperating portions of a plurality of circuit tuning elements are controlled by this mechanical device. The effect of this movement is to vary the resonant frequencies of circuits including these elements to select energy in a particular portion of the frequency spectrum covered by the tuner by shifting the tuner pass-band along said spectrum. As is well known, it is often advantageous to increase the rate of such shifting as it moves in one direction over said spectrum and to decrease it as it moves in the opposite direction, for example to move it relatively slowly, for a given rate of movement of a control (such as a rotatable shaft or dial), over the high frequency portion of the operating spectrum, and to move it relatively rapidly, for the same rate of control movement, over the low frequency portion. To this end it might be advisable to use a cam raceway having an eccentric circular pathway.

It is also possible for the cam to have a spiral pathway so that a number of complete revolutions of the cam are required for it to drive a driven element in a rectilinear direction for a predetermined distance. This type of construction is particularly suitable where vernier action is desired.

In assembling the cams to the device of Fig. 1 the cam collars are passed over opposite shaft ends with the cam raceways facing each other and with their patterns similarly oriented angularly. While a steel ball 26 is held in position between the lug ball socket and the cam raceway each cam is slid along the shaft in the direction of a lug 14 until said ball becomes captive between them and is under sufficient pressure to eliminate lost motion crosswise to the cam raceway. The pressure should not be great enough to bend the cam or bind the moving parts. Moreover, the pressure should not be great enough to prevent the ball from slipping around in the socket. (Note: A lug socket will not afford rolling contact and therefore a significant amount of friction can be produced in it by excessive pressure.) Of course, accurate formation of the socket surface and the use of a lubricating material will have obvious advantages.

In Fig. 1 a drive pulley 27 is shown attached to one end of shaft 2. It has a recess formed around its edge into which a string (not shown) may be inserted (in a manner well known in the art of tuning controls for radio receivers) for rotating the pulley under control of a knob and shaft (not shown) about which (as is customary in that art) one may wrap enough turns of the string to provide friction drive from the shaft to the string which in turn may drive pulley 27. Neither the particular pulley 27, either alone or with particular cooperating drive elements, nor any other particular type of drive for shaft 2 is an essential part of this invention. This pulley is shown merely to illustrate that shaft 2 can have rotary motion imparted to it from an external source and to show one convenient way of doing so. In operation shaft 2 is rotated by a driving force, thus turning cam 23 and causing ball 26 to roll along the cam raceway and to slip around in the lug ball socket or recess.

It is obvious that as the cam is rotated and the cam ball is made to roll along the cam raceway, the ball will occupy successive positions which lie either nearer to or farther from the shaft axis in accordance with variations in the raceway path. Since the ball is captive in the lug ball recess or socket, elevator element 7 will be driven by lug 14 nearer to or farther from shaft 2, thus elevating or lowering top platform portion 7a. Since the various guideway elements are assembled under pressure and virtually non-compressible, this movement in the guided direction will be accompanied by a minimum of movement in any other direction.

In the final assembly of this entire structure screws 8 are loosened. screws 22 are drawn up securely, and screws 8 are tightened again.

The spacer cages may be formed of thin sheet material which is softer than the materal (such as steel) of which the bal 20 and 12 are made. Each spacer lug consists of two tabs 13b joined together by a U-shaped strap. Each tab has two ball retainers 13a punched and pressed through it. These retainers preferably have short retaining walls formed perpendicularly to the tab surface to present wider retaining surfaces than the thickness of the material from the tabs are formed. The presence of these walls will reduce any tendency of the balls to ride over the edge of a retainer hole and climb out of the retainer when the elevator element is moved up and down. These short walls may be conveniently formed by the same stamping operation by which the tabs are cut out and the retainer holes punched through. If desired, of course, thicker material may be used to avoid the need for retaining walls other than those afforded by the sides of the retainer holes themselves.

If desired an operating cam surface may be formed on the edge of each cam rather than in its front surface. This, of course, will require a change in the engagement between the lug and the cam. The lug could be formed to rest on top of this edge cam surface. and. if a polished steel ball were peened into the portion of the lug which faces said cam surface, it would offer an inexpensive smooth-operating and slow-wearing surface. Since the cam could only act to drive the elevator element upward for rotation of the shaft in one direction it would be desirable to connect a tension spring between base portion 1a and top portion 7a for drawing the elevator element downward when the shaft is rotated in the other direction.

The mechanism herein has been described as made of sheet metal stampings because this economical form of construction is conveniently available according to the nature of this invention. Nevertheless it is obvious that it may comprise guideways which are formed in any of a number of other ways. The upright sides, guided sides and pressure plates may be machine finished part if desired or may be die cast. Likewise the annular raceways for carrying sets of balls to support shaft 2 may be formed as separate machined parts and then pressed into or otherwise attached to the upright sides. Likewise. the cams may consist of material into which the cam raceways have been machined rather than pressed.

It is also obvious that it is not essential for a mechanism of the kind shown that a cam be provided at each of its ends. Instead, for certain applications where extreme rigidity is not required, a single cam drive could be employed. For such an embodiment shaft 2 could be made to terminate at a point a short distance inside of upright side 1b and could be supported at that point in a known manner by a set screw screwed through the upright side and arranged to force a single polished ball between a first conical recess in the end of the shaft and a second conical recess in the end of the set screw, the two recesses facing each other. Such a set screw. of course, would also make it possible to adjust the pressure on the set of balls 3 in the annular raceway 4 of upright side 1c by turning the set screw rather than by any manipulation of the tension member.

Base portion 1a and top portion 7a have opposed parallel surfaces which may be moved nearer together or farther apart under control of shaft 2. tI is convenient to insert in the space between these surfaces a number of variable circuit elements, and, if each of them consists of two portions rectilinearly movable with respect to each other, it will be possible to achieve direct simultaneous variation of all of them by attaching the respective portions of each to the opposed surfaces. These elements may be tuning devices, such as permeability tuned inductances or condensers having concentric plates, or they may be variable resistors. Where they are tuning devices and are to be used in conjunction with vacuum tubes (in any of a variety of known ways) the tubes may be mounted on tube chassis 1f. This will be especially helpful in high frequency applications wherein the lengths of certain interconnecting wires will be critical and in which layout is important, e. g. to keep stray capacitances within required limits. In certain high frequency applications it will be further helpful to mount additional circuit elements near to both the tubes and the tuning elements. An example of this is shown in Fig. 1 in which a band switch is mounted on the front portion of chassis 1f. This will permit the use of short leads between terminals of the band switch on the one hand and tube socket prongs and terminals of variable tuning elements on the other. Thus Fig. 1 represents the physical arrangement of an adjustable circuit according to this invention. A device laid out in the manner of Fig. 1 may have its elements electrically connected in a number of known ways so that the circuit will function electrically in any of a number of desired ways.

In Fig. 1 the presence of tuning devices in the mechanism described above is illustrated by a plurality of permeability tuned inductances, each comprising a coil wound on a cylindrical dielectric coil form which is connected by any suitable means to base plate portion 1a and a cooperating insert member which may be a powdered iron core, a conductive slug or even a short-circuited winding inductively coupled to the winding on the coil form. These different types of cooperating insert members all have one thing in common, that they depend upon electrically engaging magnetic flux produced by currents moving through the coil. Therefore, in some of the claims which follow they will be described as core flux engaging elements. Each of the cooperating insert members is connected to top platform portion 7a by a mounting screw which engages a threaded hole in an insulating block 31 which may be fastened to the underside of platform portion 7a. The threaded holes are appropriately positioned so that the mounting screws while engaging them will support the insert members in alignment with center holes of the coil forms. Material is cut away from the top platform portion so that the mounting screws do not make metallic contact with it where they come through the insulating block. Such avoidance of grounding in cases where the insert members are powdered iron cores will tend to improve the Q of the tuned circuits including these inductances.

There are shown mounted on the ledge portion of tube chassis 1f a number of tube sockets 32 and, fitted into the sockets, vacuum tubes 33. A band switch whose outlines are shown in dotted lines is mounted on the front portion of tube chassis 1f and may have a shaft extending parallel to shaft 2 so that both of them extend through a control panel behind which this mechanism is mounted.

As will be indicated below, a device having the physical arrangement shown in Fig. 1 (and described above) may have its components electrically interconnected so as to constitute an improved multiband tuner either of the type used in superheterodynes which in addition to selecting signals converts them to lie within a predetermined output frequency band suitable for feeding an intermediate frequency amplifier, or of the type which both selects signals and amplifies them, (in several stages) at their original transmitted (and received) frequency, i. e. a tuned radio frequency receiver.

Figure 4:
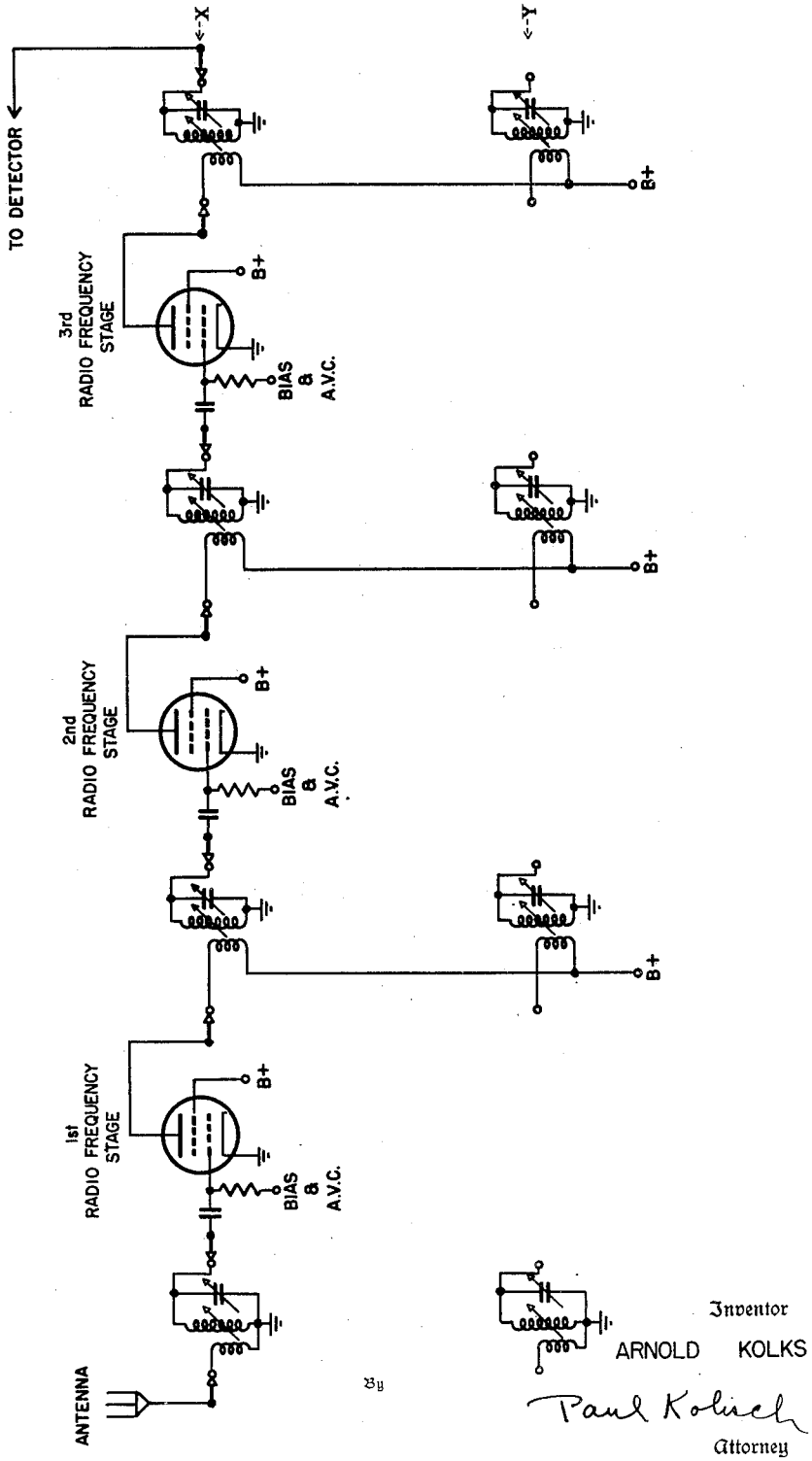

Figs. 3 and 4 show, respectively, circuits which may be employed for connecting component elements of the device of Fig. 1 so that they comprise either a tuner suitable for feeding an I. F. amplifier or the R. F. stages of a tuned radio frequency receiver. In either case band switching is provided for. For certain applications the use of the band switch may be dispensed with and elements of this device may be interconnected to form a single band tuner (such as an FM tuner, a short wave tuner, a television tuner, or a broadcast receiver tuner) either of the type suitable for feeding an I. F. amplifier or of the type having a plurality of stages all operating over the same frequency band.

Figure 2:
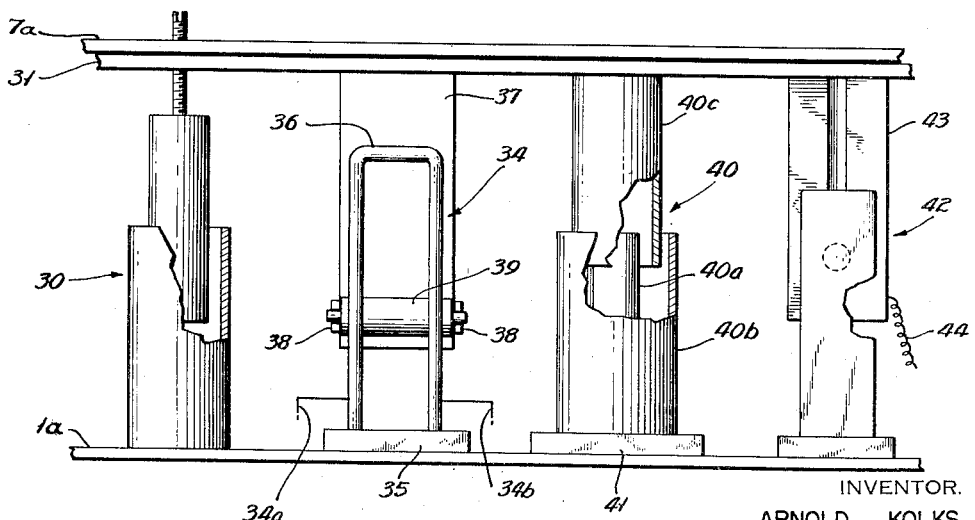
Fig. 2 is a fragmentary view of a portion of another embodiment of a tuner as in Fig. 1 showing how a number of different kinds of variable circuit elements can be mounted between two parallel surfaces of a mechanism used for directly controlling synchronous relative rectilinear movements between cooperating parts thereof.

Fig. 2 shows the installation between base portion 1a and platform portion 7a of other variable circuit elements in addition to permeability tuned inductances. Circuit element 34 consists of a short section of parallel transmission line. Its conductors 34a and 34b are fastened to an insulator 35 which is connected to base portion 1a. And at their upper ends they are rigidly connected together by a metallic fixed shorting bar 36. The conductors 34a and 34b may be of fairly heavy metallic rod or tubing having a sufficient rigidity so that circuit element 34 needs no additional support to prevent its upper end from being pushed back from its normally vertical position by a movable shorting element to be described below. In practice it may be convenient to form circuit element 34 of a single unbroken length of metallic rod or tubing bent into the inverted U-shape described. Circuit element 34 may be silver plated to provide high Q and low contact resistance with a movable shorting element to be described below. A shorting arm 37 extends perpendicularly down from platform portion 7a in a location to register behind element 34. Attached to opposite edges of arm 37 near its lower end are two extensions into each of which is formed a bearing cap 38. Across these bearing caps there is supported a movable shorting element 39 shaped like a rolling pin with its main cylindrical portion resting across conductors 34a and 34b and with its handle portions rotatably supported in the bearing caps. Shorting arm 37 is formed of a resilient material adapted to urge shorting element 39 firmly against conductors 34a and 34b. When platform portion 7a is raised or lowered with respect to base portion 1, shorting element 39 will roll along conductors 34a and 34b and in a known manner will alter the resonant frequency of element 34 which, of course, comprises a short-circuited transmission line stub, i. e. portions of conductors 34a and 34b measured from their lower ends up to shorting element 39 and the shorting element itself. Circuit element 34 may be connected into any appropriate circuit by connecting the lower ends of conductors 34a and 34b to different elements thereof in a known manner, for example, in an oscillator one may be connected to the control grid and the other to the cathode with a blocking condenser in series with one of the connections. A variable condenser 40 is also mounted between portions 1a and 7a. It comprises a relatively fixed part including an inner and an outer concentric tube, 40a and 40b, respectively, which are mounted on dielectric block 41 and an intermediate concentric tube 40c. Tubes 40a and 40b have conductive surfaces facing each other within the near zone for their highest intended operating frequency and, therefore, afford a significant amount of lumped capacitances. Intermediate tube 40c may consist of dielectric material having a dielectric constant greater than 1 so that it increases that lumped capacitances when it is inserted between the opposed surfaces. However, if desired, it may be a conductive element, and if it is the value of that lumped capacitance will still be affected by its progressive insertion into (or its progressive withdrawal from) the space between the opposed conductive surfaces of tubes 40a and 40b. It will be noted that neither of the tubes 40a or 40b is itself movable and that, therefore, fixed connections can be made between these tubes and any circuit in which they are employed. Unlike a conventional tuning condenser the movable element is not connected in the circuit and may be entirely free to float electrically.

A variable resistor 42 is also mounted between portions 1a and 7a. It comprises two main components, a flat rigid strip of dielectric material which is supported from base portion 1 to extend perpendicularly therefrom in the direction of platform portion 7a, and a conductive arm 43 which is connected to insulating block 31 on the underside of platform portion 7a to extend perpendicularly downward from it behind the dielectric strip and registered therewith. The conductive arm has a rectilinear raceway pressed into its surface facing the dielectric strip and a ball is captive between the raceway and the dielectric strip. The surface of the dielectric strip upon which this ball rolls, when platform portion 7a is moved upward or downward, carries a coating of resistive material, deposited on a narrow area extending along the dielectric strip from a point near the bottom thereof. A terminal at this point of the resistive coating may afford one of two connections necessary for including the resistor in any appropriate circuit requiring a variable resistor while the other connection may be afforded by a pigtail conductor 44 connected to the rectilinear raceway. The movable contact of variable resistor 42 will consist of a rolling ball rather than a sliding contact and for this reason the resistive coating will be subjected to a minimum of wear resulting from adjustments.

It is obvious that the number of variable circuit elements which may be included between portions 1a and 7a can be as great or as small as desired for a particular installation and that the only requirement is that the opposed surfaces of these portions be large enough for the desired number of elements.

Fig. 3 represents a suitable electrical arrangement whereby elements of a device as in Fig. 1 may be interconnected to form a three band tuner whose output is suitable for feeding an I. F. amplifier. Elements 45, 46, 47, 48, 49 and 50 are the poles of a six pole triple throw switch. These poles are connected to a single shaft to move in unison between three positions X, Y and Z. When the switch is set at any of these positions the circuit is arranged as a single band radio frequency tuner which is adapted: (1) to select energy within a pass band of predetermined width in accordance with the positioning of the pass band on a predetermined portion of the frequency spectrum; (2) to amplify that energy; (3) to mix it with local oscillations; and (4) to produce a mixer output suitable for feeding an I. F. amplifier. Accordingly, the three circuits 51a, 51b and 51c as well as three circuits 52a, 52b and 52c comprise anti-resonant circuits tunable respectively over three predetermined frequency spectra by tunable inductances or variable condensers or both. With the band selector switch in X position energy from an antenna is coupled to anti-resonant circuit 51a over an exciter primary 53. Energy in a band selected according to the tuning of anti-resonant circuit 51a is fed to a radio frequency amplifier tube 51 whose output is coupled to anti-resonant circuit 52a whose tuning elements are ganged to those of circuit 51a so that they both select energy in the same pass band. Selected signal energy in this tuned circuit (52a) will be at a higher level at that which it was received at the antenna. A local oscillator 55 has its frequency controlled by an anti-resonant circuit 56a which is tuned synchronously with the tuning of circuits 51a and 52a so that a predetermined difference frequency exists between the mid-point frequencies of their respective pass bands. Energy from circuit 56a of local oscillator 55 is connected over a blocking condenser 57 to the input of a mixer tube 58. Energy from tank circuit 52a is also connected to the input of mixer 58 so that it will produce products including a band of beat frequencies which can be selected by the input circuits of an I. F. frequency amplifier in a known manner. Each tuning element of the various anti-resonant circuits shown in this diagram may be of the sort which has its impedance varied by relative rectilinear movement between two cooperating elements. In this way it will be possible for these circuits to be conveniently, directly, and synchronously controlled in the manner described above by mechanism of the kind shown in Fig. 1.

As is well known the relative strengths of R. F. and local oscillator signals received at the mixer tube may vary at different points over a given frequency spectrum. Therefore, in certain embodiments it is desirable to change the gain of the R. F. amplifier, and/or to vary the strength of local oscillations, in synchronism with tuning. Fig. 3a shows a circuit whereby cathode bias of the radio frequency amplifier tube can be varied by the use of a variable resistor in series between its cathode and ground. This resistor may be of the type of resistor 42 shown in Fig. 2 so that it will operate in synchronism with adjustments of tuning elements in the manner described herein. Fig. 3a shows a cathode by-pass capacitor connected across its cathode resistor in a known manner for the purpose of grounding the cathode as to radio frequency currents.

Fig. 3b shows a circuit by which the strength of local oscillations may similarly be controlled by the use of a variable resistor of the type of resistor 42 shown in Fig. 2. The variable resistor is connected between the source of energizing potential for the oscillator and the anode of its oscillator tube.

Fig. 4 shows an electrical arrangement for the elements whose physical arrangement is shown in Fig. 1, whereby they can be interconnected to form a two band three stage tuned radio frequency amplifier. Each of the stages is substantially identical in its layout to the radio frequency amplification stage of the multi-band tuner of Fig. 3. In this embodiment the band switch may be an eight pole two position switch. The circuit diagram of Fig. 4 will not be described in detail inasmuch as tuned radio frequency circuits are very well known in the art.

Where the elements whose physical arrangement is shown in Fig. 1 are connected in accordance with the circuit arrangement in Fig. 3 it would be the preferred practice to employ the three permeability tuned conductors 30 shown in the background of the figure for the operating band in the highest frequency range as this would permit the shortest leads between these inductances on the one hand and the band switch and tube sockets on the other. In such a case the three tubes might be, respectively, a radio frequency amplifier tube, a local oscillator tube and a mixer tube. However, as is well known for some applications the mixer and local oscillator may be combined in a single envelope as a converter tube.

Where the elements whose physical arrangement is shown in Fig. 1 are connected as a tuned radio frequency amplifier, the tubes shown on the tube chassis 1d may be a succession of radio frequency amplifier tubes employed in a cascade of stages (as is shown in Fig. 4) and they may be of any appropriate number, not necessarily three.

Where one of the operating bands of a multi-band tuner is to be located in the region of ultra-high frequencies, it will be advisable for reasons which are well known to employ tuning elements of the type of circuit element 34 of Fig. 2.

What I claim is:

1. An adjustable circuit comprising an impedance having two component portions, means for moving the two component portions of said impedance in a rectilinear direction with respect to each other to vary its impedance, said means comprising a guideway having two relatively fixed elements connected together with inner surfaces facing each other, a relatively movable element between the fixed elements with two opposite surfaces respectively facing the inner surfaces, straight raceways in at least one of said opposite surfaces and at least one of said inner surfaces, all of the raceways being parallel to a guided axis of the guideway and each individual raceway registering with a raceway in a surface facing it, and polished balls captive between each inner surface and the opposite surface facing it, at least some of the balls being captive between registering raceways, one of said component portions being attached to at least one of the relatively fixed elements and the other portion being attached to the relatively movable element so that said rectilinear direction is parallel to the straight raceways.

2. An adjustable circuit comprising a plurality of impedances each having two component portions, means for moving the two component portions of each of the impedances in a rectilinear direction with respect to each other to vary their impedances, said means comprising at least one guideway including two relatively fixed elements connected together with inner surfaces facing each other, a relatively movable element between the fixed elements with two opposite surfaces respectively facing the inner surfaces, straight raceways in at least one of said opposite surfaces and at least one of said inner surfaces, all of the raceways being parallel to a guided axis of the guideway and each individual raceway registering with a raceway in a surface facing it, and polished balls captive between each inner surface and the opposite surface facing it, at least some of the balls being captive between registering raceways, a base portion connected to at least one of the fixed elements so that it is perpendicular thereto and to all of the raceways, and a platform portion connected to the movable element with a surface facing a surface of the base portion and parallel to it, one of the component portions of each impedance being connected to said surface of the platform portion and the other component thereof being connected to said surface of the base portion at a position permitting said rectilinear movement of the component portions with respect to each other.

ARNOLD KOLKS.

REFERENCES CITED

The following references are of record in the file of this patent:

UNITED STATES PATENTS

| Number | Name | Date |
|---|---|---|
| 2,047,868 | Harley | July 14, 1936 |
| 2,051,012 | Schaper | Aug. 11, 1936 |
| 2,186,099 | Cutting et al. | Jan. 9, 1940 |
| 2,190,082 | Polydoroff | Feb. 13, 1940 |
| 2,256,668 | Dunn et al. | Sept. 23, 1941 |
| 2,338,134 | Sands et al. | Jan. 4, 1944 |
| 2,422,774 | Conner | June 24, 1947 |

FOREIGN PATENTS

| Number | Country | Date |
|---|---|---|
| 691,113 | France | Oct. 1, 1930 |